Jan. 26, 1971  R. J. MUZZY  3,557,556
THRUST MODULATOR FOR HYBRID ROCKETS
Filed May 20, 1968

INVENTOR.
RAYMOND J. MUZZY
BY Harry A. Herbert Jr
Arsen Tashjian and
ATTORNEYS

United States Patent Office

3,557,556
Patented Jan. 26, 1971

---

3,557,556
THRUST MODULATOR FOR HYBRID ROCKETS
Raymond J. Muzzy, Saratoga, Calif., assignor to the United States of America as represented by the Secretary of the Air Force
Filed May 20, 1968, Ser. No. 730,462
Int. Cl. F02k 9/06
U.S. Cl. 60—207                          1 Claim

ABSTRACT OF THE DISCLOSURE

A multiport grain for modulating the thrust of rockets of the hybrid type. To achieve selective control of the burning rate of the grain, and for optimum performance under high thrust or low thrust modes, the grain is provided with two sets of ports. For low thrust operation, the liquid oxidizer is fed to a port in the geometric center of the grain. For high thrust operation, the liquid oxidizer is fed to a multiplicity of radially disposed ports, in addition to the center port.

BACKGROUND OF THE INVENTION

This invention relates to thrust modulation of hybrid rockets and, more particularly, to the geometry of the solid fuel grain, to achieve said thrust modulation.

Thrust modulation of hybrid rockets can, theoretically, be accomplished over a wide range of conditions, using a given grain geometry and simply modulating the oxidizer flow to the ports. However, there are practical limitations to this method of modulation. For example, when the oxidizer flow through the individual grain ports becomes low enough, heat sink occurs and results in the charring or melting of the grain surface which, in turn, prevents further throttling. Thus, there exist serious limitations to wide thrust modulation in present-day hybrids.

My invention will eliminate, or at least minimize, solid fuel combustion modulating problems.

SUMMARY OF THE INVENTION

This invention provides for more effective thrust modulation of hybrid rockets.

Therefore, an object of the invention is to permit more efficient modulation, over a wider range of conditions of hybrid rockets.

Another object, obviously, is to achieve more complete burning of the solid fuel grain.

Still another object is to provide a solid fuel grain of a particular, but variable, geometry to accomplish the purpose intended.

These, and still other objects of my invention, will become readily apparent after a consideration of the description of my invention and the drawing.

DESCRIPTION OF THE PREFERRED EMBODIMENT

Figure 1:
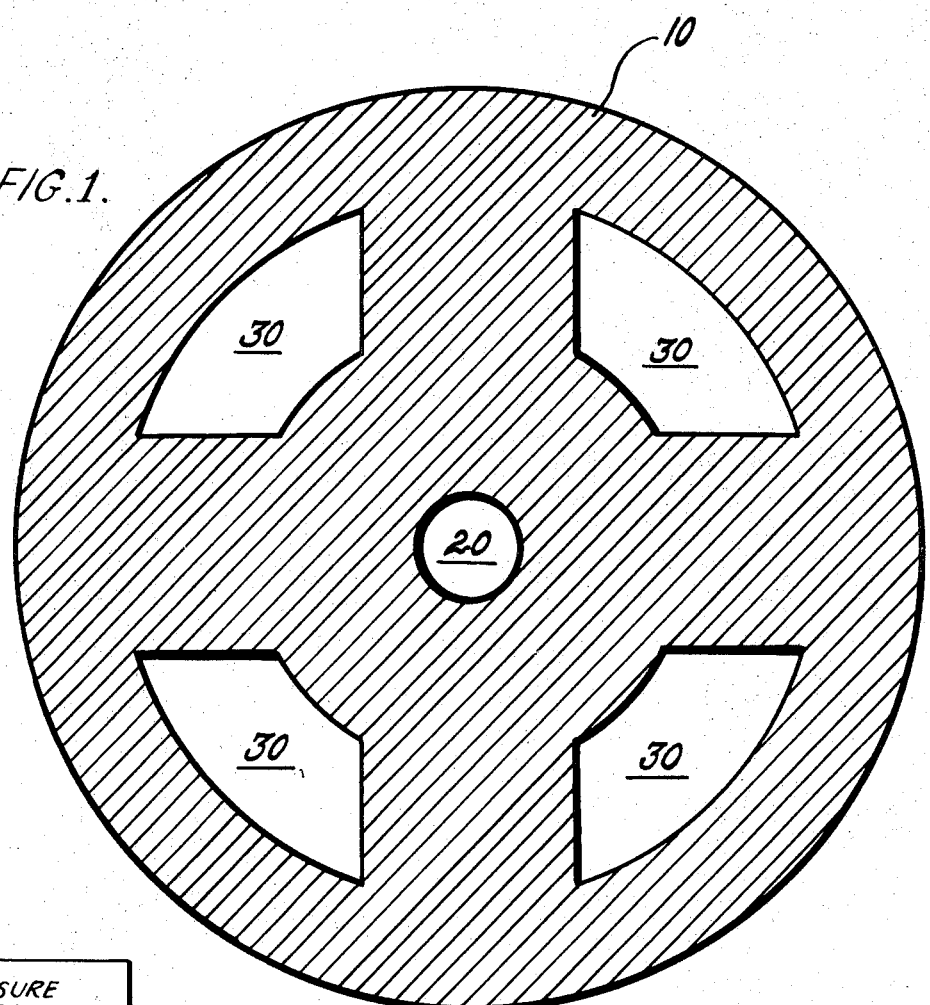
FIG. 1 is a cross-section of the solid fuel grain, according to the invention, showing a preferred multiport geometry.
Figure 2:
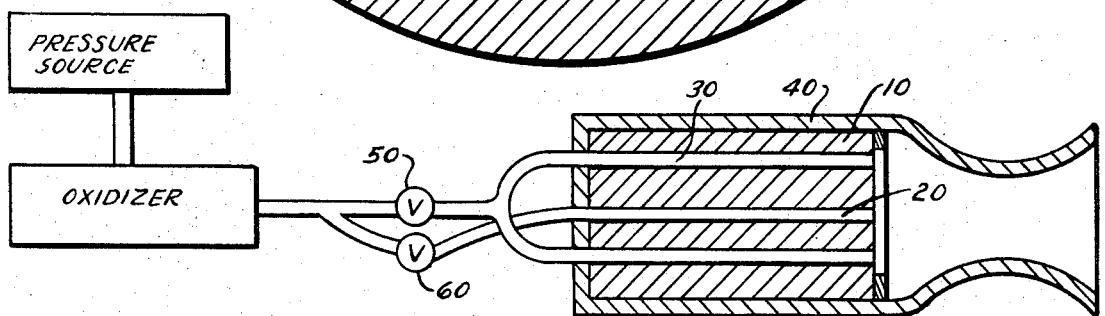
FIG. 2 is a schematic representation illustrating the mode of applying oxidizer to the propellant grain.

With reference to the drawing, the solid fuel grain 10 has a single cylindrical port 20 in the center of grain 10 and four radially disposed outer ports 30.

Single center port 20 extends throughout grain 10, as do radially disposed ports 30.

Ports 30 are equally spaced from each other and from port 20 and, as a matter of preference, are of a modified pie-shaped cross-sectional configuration.

MODE OF OPERATION OF THE PREFERRED EMBODIMENT

During the high thrust cycle, the four radially disposed ports 30 of grain 10 are fed the liquid oxidizer from a pressurized source by means of operation of valve 50 and associated piping. In addition, of course, single center port 20 may also be used simultaneously.

During the low thrust cycle, only single center port 20 is fed the liquid oxidizer from the pressurized source by means of valve 60 and its associated piping.

The combustion efficiency during the low thrust cycle is greatly enhanced, since the grain can be consumed closer to its overall stoichiometric value and not extremely fuel-rich. Further, because of the ability to use only the single center 20 and to limit the flow of liquid oxidizer through that single port, the overall combustion efficiency of grain 10 is increased, even during the high thrust cycle. Additionally, since all ports 30 and 20 can be used separately or collectively, the rocket thrust can be modulated efficiently over a wider range than present state-of-the-art techniques which make simultaneous use of all ports of multiport grains.

While there has been shown and described the fundamental features of my invention, as applied to a preferred embodiment, it is understood that various substitutions and omissions may be made by those skilled in the art, without departing from the spirit of the invention. For example—the multiport crosssectional configuration, or the number of the radially dipsosed ports may be changed.

What I claim is:
1. The method of modulating thrust over a wide range in hybrid type rockets, comprising the steps of:
 (a) feeding a liquid oxidizer at a controlled rate only through a centrally located port of a multiport solid fuel grain for low thrust applications;
 (b) and for high thrust applications feeding a liquid oxidizer through a plurality of ports of said multiport solid fuel grain, with said ports being radially disposed from said centrally located port and equidistant from each other.

References Cited

UNITED STATES PATENTS

| | | | |
|---|---|---|---|
| 2,956,401 | 10/1960 | Kane | 60—250 |
| 3,140,582 | 7/1964 | Tyson | 60—251X |
| 3,144,751 | 8/1964 | Blackman et al. | 60—251X |

OTHER REFERENCES

American Rocket Society Journal, vol. 29, No. 7, July 1959, p. 484 relied on.

DOUGLAS HART, Primary Examiner

U.S. Cl. X.R.
60—220, 251